United States Patent
Baker et al.

(10) Patent No.: US 9,055,611 B2
(45) Date of Patent: Jun. 9, 2015

(54) RESILIENT PEER NETWORK WITH 802.11 TECHNOLOGY

(71) Applicants: Roman Baker, San Jose, CA (US); Raymond R. Hayes, Los Gatos, CA (US)

(72) Inventors: Roman Baker, San Jose, CA (US); Raymond R. Hayes, Los Gatos, CA (US)

(73) Assignee: Broadcom Corporation, Irvine, CA (US)

(*) Notice: Subject to any disclaimer, the term of this patent is extended or adjusted under 35 U.S.C. 154(b) by 99 days.

(21) Appl. No.: 13/756,367

(22) Filed: Jan. 31, 2013

(65) Prior Publication Data
US 2014/0177613 A1    Jun. 26, 2014

Related U.S. Application Data

(60) Provisional application No. 61/745,185, filed on Dec. 21, 2012.

(51) Int. Cl.
*H04W 84/12* (2009.01)
*H04W 84/20* (2009.01)
*H04W 84/22* (2009.01)

(52) U.S. Cl.
CPC .............. *H04W 84/12* (2013.01); *H04W 84/22* (2013.01); *H04W 84/20* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 8,666,394 B1 * | 3/2014 | Montemurro et al. | 455/426.1 |
| 2006/0123118 A1 * | 6/2006 | Choe et al. | 709/227 |
| 2006/0165024 A1 * | 7/2006 | Iwami et al. | 370/315 |
| 2006/0233142 A1 * | 10/2006 | Iwamura | 370/338 |
| 2009/0097440 A1 * | 4/2009 | Sakoda | 370/328 |
| 2011/0026504 A1 * | 2/2011 | Feinberg | 370/338 |
| 2011/0280152 A1 * | 11/2011 | Saito et al. | 370/254 |
| 2012/0120934 A1 * | 5/2012 | Cho | 370/338 |
| 2012/0265913 A1 * | 10/2012 | Suum ki et al. | 710/303 |
| 2012/0278389 A1 * | 11/2012 | Thangadorai | 709/204 |
| 2013/0227152 A1 * | 8/2013 | Lee et al. | 709/227 |
| 2013/0242840 A1 * | 9/2013 | Tolhuizen et al. | 370/311 |
| 2014/0078928 A1 * | 3/2014 | Verma et al. | 370/254 |

FOREIGN PATENT DOCUMENTS

WO    WO2012060611 A2 *  11/2011  ............ H04W 48/16

* cited by examiner

*Primary Examiner* — Faruk Hamza
*Assistant Examiner* — Cassandra Decker
(74) *Attorney, Agent, or Firm* — Garlick & Markison; Randy W. Lacasse

(57) ABSTRACT

A Wi-Fi Direct Group Owner stores network parameters needed for proper operation of a peer-to-peer network. These include the network name and identifier, the power save schedule, the security settings, MAC address of all of the group members, etc. To reduce the need for a single Group Owner, this information is distributed. As each new device is added to the network, all of these parameters are passed via IEEE 802.11 data packets from the device acting as the Group Owner to the new peer device. This way, the new peer device has all of the information about the group at the time that it joins. Any device in the Resilient Peer Network can temporarily take on the role of a traditional Wi-Fi Direct Group Owner (admission control). Selection of which peer will act as a Group Owner will depend on a user action or network event.

20 Claims, 6 Drawing Sheets

RESILIENT PEER NETWORK WITH 802.11 TECHNOLOGY

CROSS REFERENCE TO RELATED APPLICATIONS

The present U.S. Utility Patent Application claims priority pursuant to 35 U.S.C. §119(e) to U.S. Provisional Patent Application Ser. No. 61/745,185, entitled, "Resilient Peer Network with 802.11 Technology," filed Dec. 21, 2012, pending, which is hereby incorporated herein by reference in its entirety and made part of the present U.S. Utility patent application for all purposes:

The following IEEE standards/draft standards are hereby incorporated herein by reference in their entirety and are made part of the present U.S. Utility patent application for all purposes:

1. IEEE Std 802.11n™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, Sponsored by the LAN/MAN Standards Committee, IEEE Std 802.11n™-2012, (Revision of IEEE Std 802.11-2007), 2793 total pages (incl. pp. i-xcvi, 1-2695).

2. IEEE Std 802.11n™-2009, "IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Computer Society, IEEE Std 802.11n™-2009, (Amendment to IEEE Std 802.11™-2007 as amended by IEEE Std 802.11k™-2008, IEEE Std 802.11r™-2008, IEEE Std 802.11y™-2008, and IEEE Std 802.11r™-2009), 536 total pages (incl. pp. i-xxxii, 1-502).

3. IEEE Draft P802.11-REVmb™/D12, November 2011 (Revision of IEEE Std 802.11™-2007 as amended by IEEE Std 802.11k™-2008, IEEE Std 802.11r™-2008, IEEE Std 802.11y™-2008, IEEE Std 802.11w™-2009, IEEE Std 802.11n™-2009, IEEE Std 802.11p™-2010, IEEE Std 802.11z™-2010, IEEE Std 802.11v™-2011, IEEE Std 802.11u™-2011, and IEEE Std 802.11s™-2011), "IEEE Standard for Information technology—Telecommunications and information exchange between systems—Local and metropolitan area networks—Specific requirements; Part 11: Wireless LAN Medium Access Control (MAC) and Physical Layer (PHY) Specifications," Prepared by the 802.11 Working Group of the LAN/MAN Standards Committee of the IEEE Computer Society, 2910 total pages (incl. pp. i-cxxviii, 1-2782).

4. IEEE P802.11ac™/D2.1, March 2012, "Draft STANDARD for Information Technology—Telecommunications and information exchange between systems—Local and metropolitan area networks—Specific requirements, Part 11: Wireless LAN Medium Access Control (MAC) and Physical Layer (PHY) specifications, Amendment 4: Enhancements for Very High Throughput for Operation in Bands below 6 GHz," Prepared by the 802.11 Working Group of the 802 Committee, 363 total pages (incl. pp. i-xxv, 1-338).

5. IEEE P802.11ad™/D6.0, March 2012, (Draft Amendment based on IEEE P802.11REVmb D12.0), (Amendment to IEEE P802.11REVmb D12.0 as amended by IEEE 802.11ae D8.0 and IEEE 802.11aa D9.0), "IEEE P802.11ad™/D6.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," Sponsor: IEEE 802.11 Committee of the IEEE Computer Society, IEEE-SA Standards Board, 664 total pages.

6. IEEE Std 802.11ae™-2012, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," "Amendment 1: Prioritization of Management Frames," IEEE Computer Society, Sponsored by the LAN/MAN Standards Committee, IEEE Std 802.11ae™-2012, (Amendment to IEEE Std 802.11™-2012), 52 total pages (incl. pp. i-xii, 1-38).

7. IEEE P802.11af™/D1.06, March 2012, (Amendment to IEEE Std 802.11REVmb™/D12.0 as amended by IEEE Std 802.11ae™/D8.0, IEEE Std 802.11aa™/D9.0, IEEE Std 802.11ad™/D5.0, and IEEE Std 802.11ac™/D2.0),"Draft Standard for Information Technology—Telecommunications and information exchange between systems—Local and metropolitan area networks—Specific requirements—Part 11: Wireless LAN Medium Access Control (MAC) and Physical Layer (PHY) Specifications—Amendment 5: TV White Spaces Operation," Prepared by the 802.11 Working Group of the IEEE 802 Committee, 140 total pages (incl. pp. i-xxii, 1-118)

BACKGROUND OF THE INVENTION

1. Technical Field of the Invention

This technology described herein relates generally to wireless communications and more particularly to circuits used to support wireless communications.

2. Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP, LTE, LTE Advanced, RFID, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to one or more antennas (e.g., MIMO) and includes one or more low noise amplifiers, one or more intermediate frequency stages, a filtering stage, and a data recovery stage. The low noise amplifier(s) receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Currently, wireless communications occur within licensed or unlicensed frequency spectrums. For example, wireless local area network (WLAN) communications occur within the unlicensed Industrial, Scientific, and Medical (ISM) frequency spectrum of 900 MHz, 2.4 GHz, and 5 GHz.

Modern peer network technologies in the 802.11 space can suffer from a single point of failure. Specifically, peer networks utilizing the Wi-Fi Alliance (WFA) Wi-Fi Direct technology will fail if the device designated as the Group Owner (GO) withdraws from the network for any reason.

Disadvantages of conventional approaches will be evident to one skilled in the art when presented in the disclosure that follows.

BRIEF DESCRIPTION OF THE SEVERAL VIEWS OF THE DRAWING(S)

DETAILED DESCRIPTION OF THE INVENTION

The technology described herein is directed to an apparatus and methods of operation that are further described in the following Brief Description of the Drawings and the Detailed Description of the Invention. Other features and advantages will become apparent from the following detailed description made with reference to the accompanying drawings.

Figure 1:
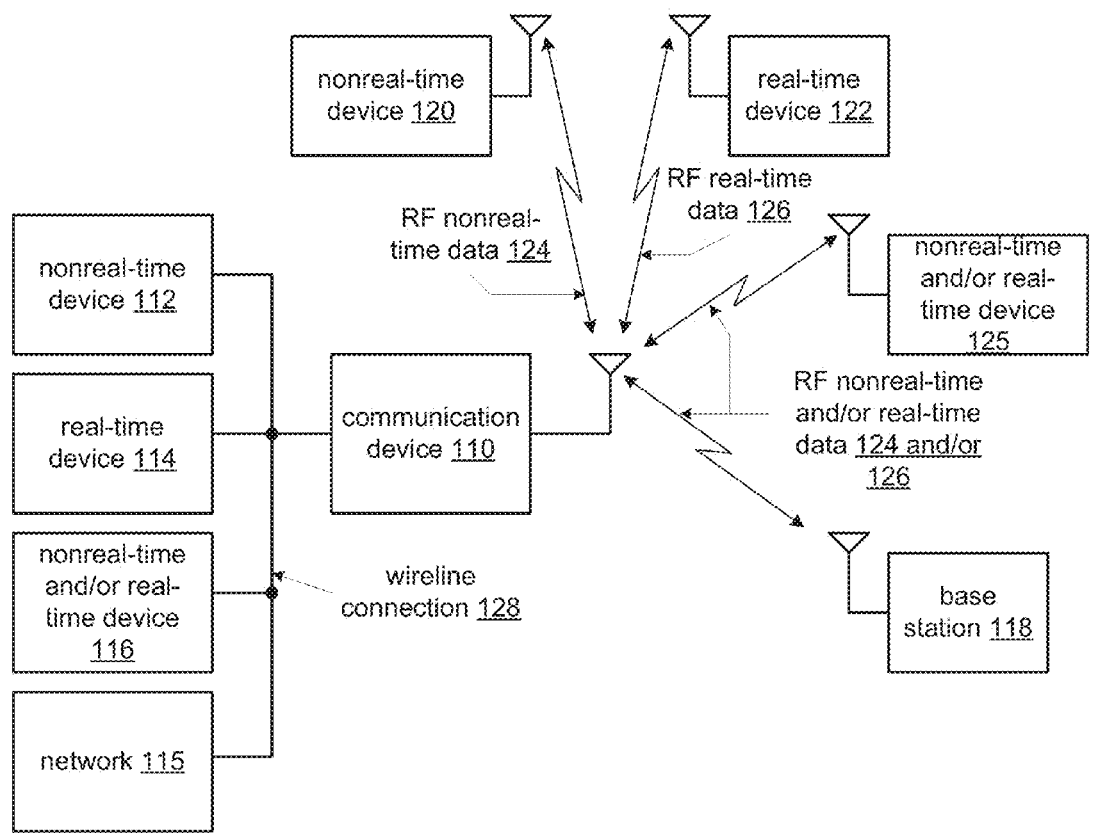
FIG. 1 is a schematic block diagram of an embodiment of a wireless communication system.

FIG. 1 is a schematic block diagram of a communication system in accordance with the technology described herein. In particular, a communication system is shown that includes a communication device 110 that communicates real-time data 126 and/or non-real-time data 124 wirelessly with one or more other devices such as base station 118, non-real-time device 120, real-time device 122, and non-real-time and/or real-time device 125. In addition, communication device 110 can also optionally communicate over a wireline connection with network 115, non-real-time device 112, real-time device 114, and non-real-time and/or real-time device 116.

In an embodiment of the technology described herein the wireless connection can communicate in accordance with a wireless network protocol such as Wi-Fi, WiHD, NGMS, IEEE 802.11a, ac, b, g, n, or other 802.11 standard protocol, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication path can include separate transmit and receive paths that use separate carrier frequencies and/or separate frequency channels. Alternatively, a single frequency or frequency channel can be used to bi-directionally communicate data to and from the communication device 110.

Communication device 110 can be a mobile phone such as a cellular telephone, a local area network device, personal area network device or other wireless network device, a personal digital assistant, game console, personal computer, laptop computer, or other device that performs one or more functions that include communication of voice and/or data via wireline connection 128 and/or the wireless communication path. Further communication device 110 can be an access point, base station or other network access device that is coupled to a network 115 such at the Internet or other wide area network, either public or private, via wireline connection 128. In an embodiment of the technology described herein, the real-time and non-real-time devices 112, 114 116, 118, 120, 122 and 125 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 126 includes voice, audio, video and multimedia applications including gaming, etc. The non-real-time data 124 includes text messaging, email, web browsing, file uploading and downloading, etc.

In an embodiment of the technology described herein, the communication device 110 includes a wireless communications device that includes one or more features or functions of the technology described herein.

Figure 2:
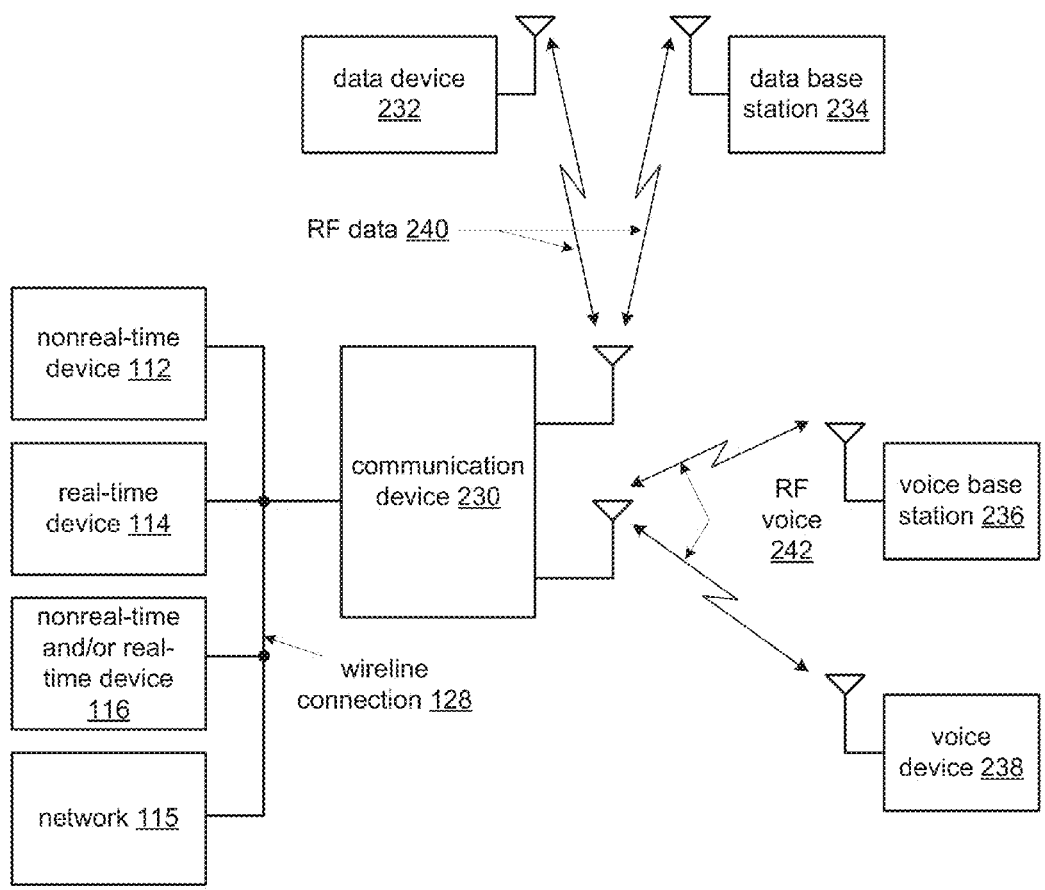
FIG. 2 is a schematic block diagram of another embodiment of a wireless communication system.

FIG. 2 is a schematic block diagram of an embodiment of another communication system in accordance with the technology described herein. In particular, FIG. 2 presents a communication system that includes many common elements of FIG. 1 that are referred to by common reference numerals. Communication device 230 is similar to communication device 110 and is capable of any of the applications, functions and features attributed to communication device 110, as discussed in conjunction with FIG. 1. However, communication device 230 includes two or more separate wireless transceivers for communicating, contemporaneously, via two or more wireless communication protocols with data device 232 and/or data base station 234 via RF data 240 and voice base station 236 and/or voice device 238 via RF voice signals 242.

In an embodiment of the technology described herein, the communication device 230 includes a wireless communications device that includes one or more features or functions of the technology described herein. Further details including optional functions and features of the wireless communications device are discussed in conjunction with FIGS. 3-6 that follow.

A wireless local area network (WLAN) links two or more devices using some wireless distribution method (typically spread-spectrum or OFDM radio), and can provide a connection through an access point to the wider Internet. This gives users the mobility to move around within a local coverage area and still be connected to the network. Most modern WLANs are based on IEEE 802.11 standards.

Figure 3:
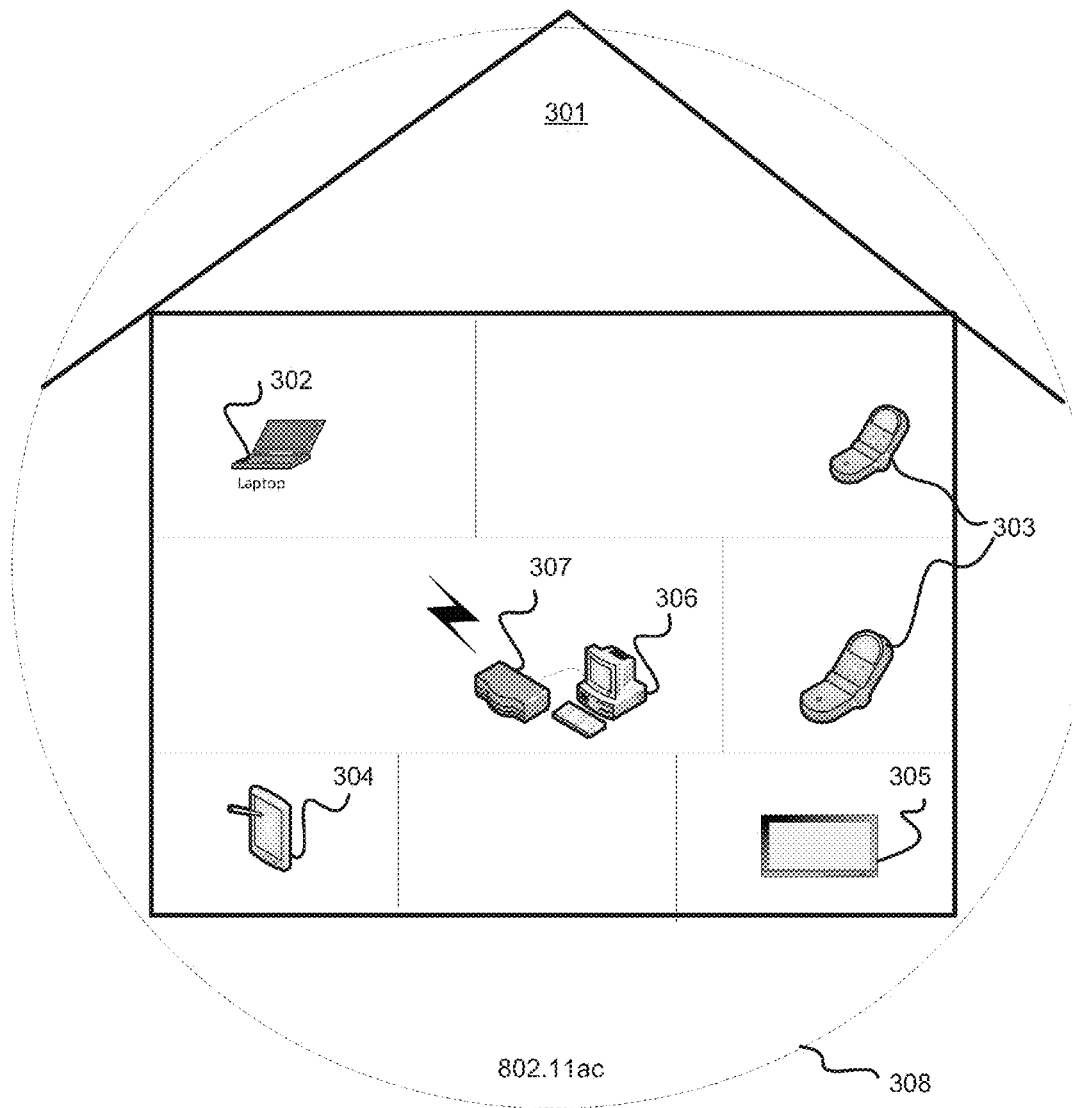
FIG. 3 illustrates one embodiment of a home or building structure (premises) with one or more devices, wired or wireless, connected on a home network (802.11ac)

As shown in FIG.3, a home or building structure (premises) 301 has one or more devices, wired or wireless (e.g., laptops 302, smart phones 303, tablets 304, web-enabled TVs 305, PCs 306, and other devices, etc.) connected on a home network. Internet services (e.g., broadband or high speed broadband) are provided to the premises over wired (e.g., telephone, fiber, satellite, or cable) or wireless (e.g., 3G, 4G, etc.) networks. Router 307, typically connected to a PC or WiFi hotspot, will control connection of the various devices to the internet using the 802.11ac protocol 308. In the past, other variations of the 802.11 standard have been used.

Unlike the home network, a peer-to-peer (P2P) network is one in which each communications device in the network can act as a client or server for the other devices in the network, allowing shared access to various resources such as files, peripherals, and sensors without the requirement for a central server or dedicated Internet access point. Peer-to-peer networks can be used for sharing content such as audio, video, data, or anything in digital format. Various embodiments as described in association with FIGS. 4-6 will incorporate peer-to-peer groups.

As previously stated, a wireless local area network (WLAN) links two or more devices using some wireless distribution method (typically spread-spectrum or OFDM radio), and in some embodiments can provide a connection through an access point (e.g., as shown in FIG. 3) to the wider Internet. While various 802.11 standards have varying range and susceptibility to noise, modern peer-to-peer network technologies in the 802.11 space can suffer from a single point of failure. Specifically, peer-to-peer networks utilizing the Wi-Fi Alliance (WFA) Wi-Fi Direct technology will fail if the device designated as the Group Owner (GO) withdraws from the network for any reason. In a one or more embodiments described herein, a resilient peer network is used to reduce reliance on group owners (GOs).

All peers in a group store the network name, network ID and security settings. But the group owner is the only peer that stores all of the MAC addresses of the other group members and has full visibility to each peer's power save schedule.

Figure 4:
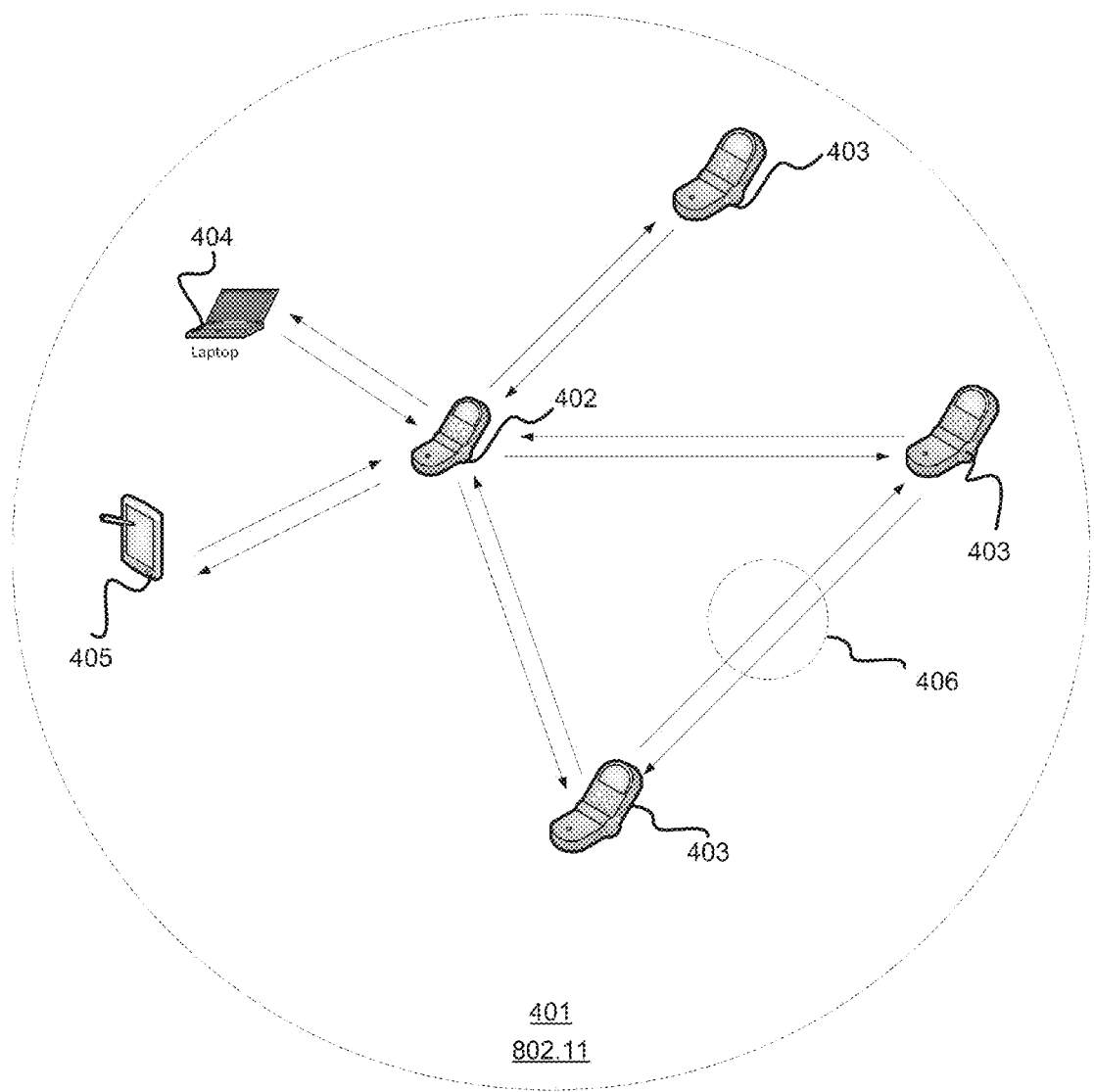
FIG. 4 illustrates an embodiment of a peer-to-peer group.

As shown in FIG. 4, a peer-to-peer group 401 includes various wirelessly connected devices, for example, cell phone(s) 402 and smart phone(s) 403(3), laptop(s) 404, tablets 405, PCs (not shown) and other devices, etc. When connected to the peer-to-peer group, each device represents an individual peer within that peer-to-peer group. A Group Owner (GO), for example cell phone 402, will control connection of the various devices in the group using, for example, but not limited to, the 802.11(N) protocol (where N represents any version of the 802.11 standard, e.g., 802.11g, 802.11n, 802.11ac, etc.). In one embodiment, each peer initiates a Tunneled Direct Link Setup (TDLS) 406 for direct communication between peer devices in the group. In alternative embodiments, the peer-to-peer network also includes one or more nodes capable of cross-connecting to another network. For example, Internet services (e.g., broadband or high speed broadband) can, in some embodiments, be provided to one or more communication devices using broadband Internet access from, e.g., telephone, fiber, satellite, cellular or cable networks (e.g., 3G, 4G, etc.).

Figure 5:
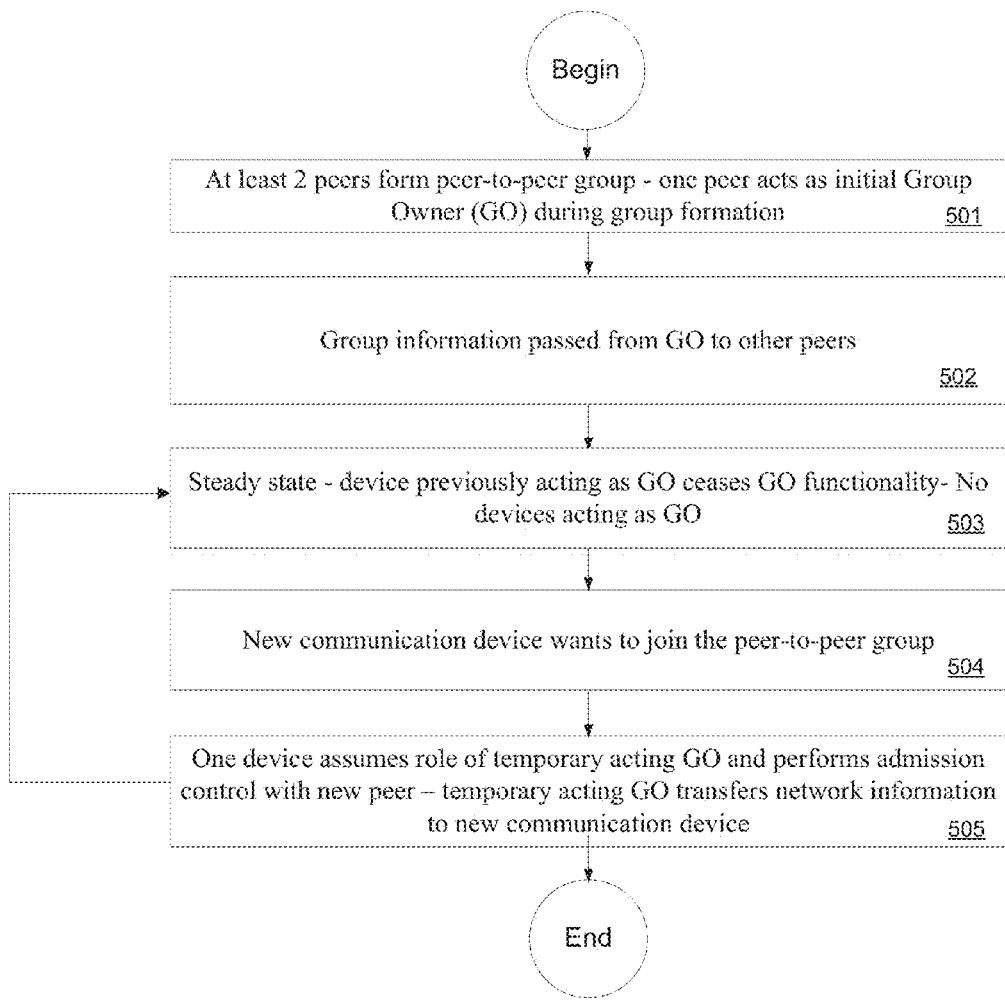
FIG. 5 illustrates an embodiment of a flow for general Group Owner information handling in order to reduce single point failures.

In one embodiment, to reduce the reliance on a single Group Owner, the group information is distributed. FIG. 5 illustrates a flow for the general Group Owner information handling. In group formation step 501, as the peer-to-peer network is formed (at least 2 peers), one communication device (peer) in the group acquires initial acting Group Owner status. The initial acting Group Owner will control access to the peer group and obtains, stores and manages the peer-to-peer group information (e.g., network name and identifier, power save schedule, security settings and MAC address of all of the group members). In addition, in one embodiment, each peer initiates a Tunneled Direct Link Setup (TDLS) 406 (FIG. 4) for direct communication between peer devices in the group. In prior known systems, if the initial acting Group Owner device left the network or became disabled for any reason, all peers would lose connection and the peer group operation would cease. However, in the technology described herein, group information is distributed. The group simply enters a functional steady state if the acting Group Owner is no longer available as described in greater detail hereafter.

During step 502, the initial acting Group Owner will pass the group information to the other peers to enable any of them to take the Group Owner status if needed. A steady state is achieved in step 503 when no device is acting as Group Owner either because the previously acting Group Owner is no longer available or stops sending out beacons (i.e., being discoverable).

In step 504, a new device(s) requests to join the existing peer-to-peer group. When these devices are added to the peer-to-peer network (join), all of the parameters (group information) are transferred (passed) to the new device via IEEE 802.11 data packets from the device acting as the Group Owner to the new peer device (e.g., communication device). If in the steady state (i.e., no acting Group Owner designated), one peer in the group will temporarily assume the role of Group Owner 505 to perform the transfer of group information. After the transfer, the new peer device has all of the information about the group and could assume the role of acting Group Owner. At this point, the device that was acting as the temporary acting Group Owner can, in one embodiment, cease this functionality and revert to its previous steady state.

Figure 6:
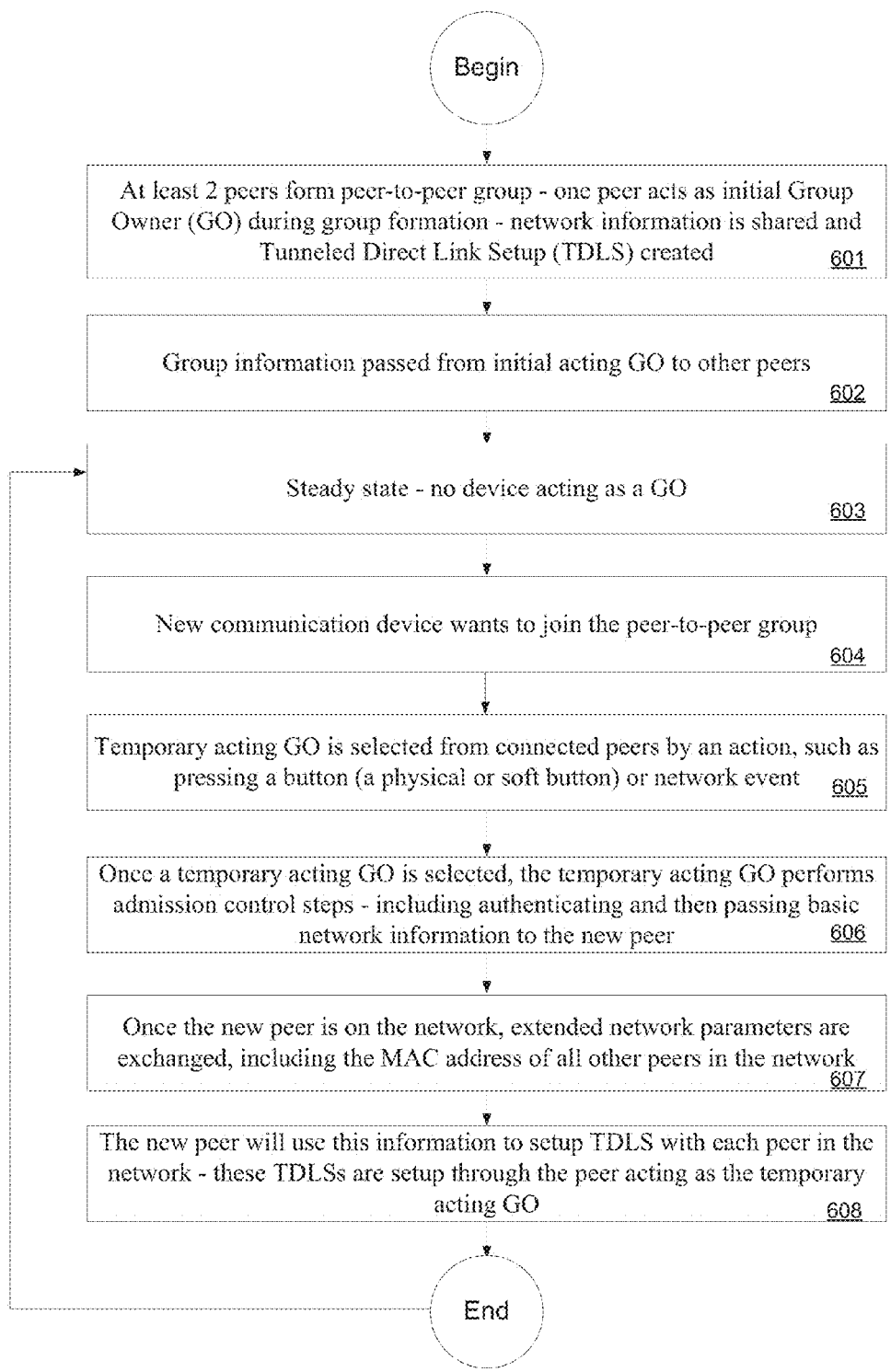
FIG. 6 illustrates another embodiment of a flow for Group Owner information handling in order to reduce single point failures.

FIG. 6 illustrates another embodiment for general Group Owner information handling in order to reduce single point failures. FIG. 6 illustrates a flow for the general Group Owner information handling. In group formation step 601, as the peer-to-peer network is formed (at least 2 peers), one communication device (peer) in the group acquires initial acting Group Owner status. The initial acting Group Owner will control access to the peer group and obtains, stores and manages the peer-to-peer group information (e.g., network name and identifier, power save schedule, security settings and MAC address of all of the group members). In addition, in one embodiment, each peer initiates a Tunneled Direct Link Setup (TDLS) 406 (FIG. 4) for direct communication between peer devices in the group. In prior known systems, if the initial acting Group Owner device left the network or became disabled for any reason, all peers would lose connection and the peer group operation would cease. However, in the technology described herein, group information is distributed. The group simply enters a functional steady state if the acting Group Owner is no longer available as described in greater detail hereafter.

During step 602, the initial acting Group Owner will pass the group information to the other peers to enable any of them to take the Group Owner status if needed. A steady state is achieved in step 603 when no device is acting as Group Owner either because the previously acting Group Owner is no longer available or stops sending out beacons (i.e., being discoverable).

In step 604, a new device(s) requests to join the existing peer-to-peer group. When these devices are added to the peer-to-peer network (join), all of the parameters (group information) are transferred (passed) to the new device via IEEE 802.11 data packets from the device acting as the Group Owner to the new peer device (e.g., communication device) as described in detail below.

In step 605, selection of which peer will act as a temporary acting Group Owner will depend on a user action or network event. Such user actions/network events can be, but not limited to, various embodiments including manual steps such as a pressed button (a physical or a soft button) or in alternative embodiments, proximity detection (NFC or other technology) or similar events. Once a peer to be the temporary acting Group Owner is selected, in step 606, the temporary acting Group Owner performs admission control steps for a new device requesting to join the existing peer-to-peer group. A first step is authentication and then transference of basic network information (one or more network parameters such as network name and identifier, power save schedule, security settings) to the new peer. This is performed, for example, through a mechanism like Wi-Fi Protected Setup or other similar mechanisms.

Once the peer is part of the peer-to-peer group (network), in step 607, extended network parameters are exchanged, including the MAC address of all other peers in the network. In step 608, in one embodiment, the new peer will use this information to setup Tunneled Direct Link Setup (TDLS) tunnels with each other peer in the network. These tunnels are setup through the peer acting as a Group Owner. Once this step is complete, the new peer has all of the information for the network and all of the previous peers have learned of the new peer. At this point, the device that was acting as the temporary acting Group Owner can, in one embodiment, cease this functionality and revert to its previous steady state. The process is continuous while the peer-to-peer group is active.

In one embodiment, all devices can communicate with all others via TDLS tunnels, and therefore packets no longer go through a Group Owner. The need for a Group Owner that sends out an IEEE 802.11 beacon frame is gone. In one embodiment, devices are modified to not rely on beacon frames to keep the network operating.

Comparative advantages include, but are not limited to: elimination of the single point of failure that afflicts Wi-Fi Direct networks; power saving techniques at the 802.11 layer 2 results in increased battery life and since close-proximity peer network applications are targeted, complicated multi-hop routing protocols (and related latency and bandwidth degradation) are avoided.

There can be many different methods of admission control, some of which will be more suitable to specific devices than others. The embodiments provided are not limited to any particular method of admission control.

Throughout the specification, drawings and claims various terminology is used to describe the various embodiments. As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

In an embodiment of the technology described herein, receiver and transmitter processing modules are implemented via use of a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. In some embodiments, the associated memory is a single memory device or a plurality of memory devices that are either on-chip or off-chip. Such a memory device includes a read-only memory, random access memory, volatile memory, non-volatile memory, static memory, dynamic memory, flash memory, and/or any device that stores digital information. Note that when the processing devices implement one or more of their functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

The invention claimed is:

1. A resilient peer network comprising:
 a first communication device configured to:
  communicatively couple to other communication devices to form a peer-to-peer group;
  receive and store network parameters including MAC addresses of the other communication devices of the peer-to-peer group from an acting group owner (GO) without the first communication device becoming an acting group owner (GO), and wherein the acting group owner subsequently enters a steady state such that the communication devices in the peer-to-peer group continue communicating without any communication device in the peer-to-peer group acting as an acting group owner and transmitting beacon frames;
  detect at least one new communication device request for admittance to the peer-to-peer group while the peer-to-peer group operates without an acting group owner;
  at least temporarily take over as the acting group owner (GO);
  admit the at least one new communication device; and
  transmit the network parameters of the peer-to-peer group, including the communication device MAC addresses, to the at least one new communication device.

2. The resilient peer network of claim 1, wherein the network parameters further include one or more of: network name and identifier, power save schedule or security settings.

3. The resilient peer network of claim 1, wherein the first communication device is further configured to return to a steady state after transmitting the network parameters thus leaving the peer-to-peer group to continue to operate without the acting group owner (GO).

4. The resilient peer network of claim 1, wherein the first communication device is further configured to temporarily take over the acting group owner (GO) responsibilities upon any of: a failure by the acting group owner, withdrawal from the resilient peer network by the acting group owner, a manual selection or a network event.

5. The resilient peer network of claim 1, wherein the communicatively coupling includes communicating using 802.11 standards.

6. The resilient peer network of claim 1, wherein at least one of the first or other communication devices in the peer-to-peer group includes a network cross-connection to any of: a wireline, a wireless, an RF, a cable, a fiber or a cellular network.

7. The resilient peer network of claim 1, wherein at least the first communication device is further configured to form direct communication paths to the other communication devices using tunneled direct link setup (TDLS).

8. A method of creating a resilient peer network comprising:
   acting as a temporary group owner (GO) to communicatively couple communication devices to form a peer-to-peer group;
   transmitting network parameters including MAC addresses of all members of the peer-to-peer group to all other members of the peer-to-peer group without requiring any of the members to become a new group owner (GO);
   entering a steady state without responsibilities of the temporary group owner (GO) such that the communication devices in the peer-to-peer group continue communicating without any of the members in the peer-to-peer group acting as a group owner and transmitting beacon frames;
   detecting at least one new communication device request for admittance to the peer-to-peer group while the peer-to-peer group operates without a group owner; and
   designating acting group owner (GO) responsibilities to one of the members, whereupon the designated acting group owner admits the at least one new communication device.

9. The method of creating a resilient peer network of claim 8, wherein the network parameters further comprise one or more of: network name and identifier, power save schedule or security settings.

10. The method of creating a resilient peer network of claim 8, wherein the network parameters are not transferred to the at least one new communication device during the designating group owner (GO) responsibilities.

11. The method of creating a resilient peer network of claim 8, wherein the designated acting group owner is designated because of any of: failure by an existing acting group owner, withdrawal from the resilient peer network by the existing acting group owner, a manual selection or a network event.

12. The method of creating a resilient peer network of claim 8, wherein the communication devices coupled to form the peer-to-peer group form direct communication paths using tunneled direct link setup (TDLS).

13. The method of creating a resilient peer network of claim 8, wherein the peer-to-peer group communicates uses 802.11 standards.

14. A method of creating a resilient peer network comprising:
   forming the resilient peer network through peer-to-peer communication connections between a plurality of communication devices;
   designating one of the plurality of communications devices in the resilient peer network as an acting group owner (GO) with the acting group owner (GO) obtaining, storing, managing and distributing network parameters to all other ones of the plurality of communication devices in the resilient peer network, wherein the acting group owner subsequently enters a steady state such that the communication devices in the resilient peer network continue communicating without any communication device in the resilient peer network acting as an acting group owner and transmitting beacon frames; and
   receiving a request from a new device to join the formed resilient peer network while the resilient peer network operates without an acting group owner;
   designating any of other ones of the plurality of communication devices in the resilient peer network to be a temporary acting group owner (GO); and
   transferring the network parameters from the temporary acting group owner to the requesting new device.

15. The method of creating a resilient peer network of claim 14, wherein the network parameters comprise basic network parameters including at least one of: a network name and identifier, power save schedule or security settings and extended network parameters including at least MAC addresses of the plurality of communication devices in the resilient peer network.

16. The method of creating a resilient peer network of claim 14, wherein the transferring step comprises a two-step process where authentication and transfer of basic network information occur in a first step and transfer of the extended network parameters including at least the MAC addresses occurs in a second step after the requesting new device has been admitted to the resilient peer network.

17. The method of creating a resilient peer network of claim 14, wherein the temporary acting group owner (GO) is designated upon any of: failure by the acting group owner (GO), withdrawal from the resilient peer network by the acting group owner, a manual selection or a network event.

18. The method of creating a resilient peer network of claim 14, wherein the plurality of communication devices connected to form the resilient peer network form direct communication paths using tunneled direct link setup (TDLS).

19. The method of creating a resilient peer network of claim 14, wherein the requesting new device uses one or more of the network parameters to form direct communication paths with any of the plurality of communication devices in the resilient peer network using tunneled direct link setup (TDLS).

20. The method of creating a resilient peer network of claim 14, wherein both the acting group owner and the temporary acting group owner can return to a steady state.

* * * * *